3,058,807
PROCESS FOR PREPARING PHOSPHOR GRADE METAL SULFIDES
Russell Sedgwick Holland, Milltown, N.J., assignor to E. I. du Pont de Nemours and Company, Wilmington, Del., a corporation of Delaware
No Drawing. Filed Mar. 5, 1959, Ser. No. 797,332
8 Claims. (Cl. 23—134)

The invention relates to a method of making zinc sulfide, cadmium sulfide and zinc-cadmium sulfide. More particularly it relates to a method of making said sulfides in a manner which makes them especially suitable for the production of phosphors. Still more particularly it relates to a new method of producing the above sulfides from a reaction of water soluble zinc and cadmium salts and hydrogen sulfide.

The physical nature of a sulfide precipitate depends particularly on factors affecting the rate of precipitation. A product of desirable quality for use in making phosphors should be a soft, free-flowing powder. The precipitation of such a product from the reaction medium should be moderately slow while settling of the precipitate should be rapid from a slurry in water. In addition the resulting precipitate should not cake upon drying and such precipitates must be capable of producing efficient phosphors.

Rapid precipitation which is characteristic of the prior art methods causes considerable occlusion of impurities and a tendency of the precipitate to cake upon drying. This is, of course, undesirable when the compounds are to be used for the preparation of phosphors. A large number of patents have issued on the manufacture of zinc sulfide, principally for use in the pigment field. Only a few, however, are concerned with direct reactions between gaseous hydrogen sulfide and solutions of suitable zinc and cadmium salt. The prior art discloses the technique of either passing hydrogen sulfide gas into the soluble metal salt solution, use of a Venturi mixer, or a system where the hydrogen sulfide gas and salt solution are in counter-current flow. These systems involve reacting hydrogen sulfide and the metal salts in a two-phase system with its attendant disadvantage of lack of control over the particle size and uniformity of product. The use of a system using a Venturi mixer, even though it provides intimate contact between relatively small globules of salt solution and gas molecules, still has the above disadvantages. It also requires relatively complicated and expensive equipment. Insofar as the zinc-cadmium sulfide product is concerned, it is quite difficult to provide a uniform product because cadmium sulfide is formed much more rapidly than zinc sulfide in a mixed salt solution in an acid reaction. It is known to form zinc-cadmium sulfide by preparing a solution of zinc and cadmium chlorides and then adding concentrated ammonia until a precipitate is formed and then dissolved. The resulting solution is diluted with water to about 10 grams of the metals as metal ions per liter. The zinc-cadmium sulfides are formed by introducing a stream of hydrogen sulfide into the ammoniacal mixture. This alkaline process has serious disadvantages, the main one of which is that the zinc-cadmium sulfide particles are to a substantial degree colloidal in size and hence do not settle out of solution. This, of course, rules out decantation as a means of separating the liquid and precipitate and for obvious physical reasons makes filtration difficult to carry out. It has been proposed to produce zinc-cadmium sulfide by passing hydrogen sulfide first into zinc sulfate solution alone and then adding cadmium sulfate while continuing the introduction of hydrogen sulfide. This method has not been satisfactory because of the quality of the co-precipitated crystals which are non-uniform both in size and ratio of quantities of each metal in the crystals. The method by counter-current flow of zinc sulfate solution and hydrogen sulfide gas is unsatisfactory for some of the reasons set forth above. All of the above methods involve precipitating the zinc sulfide in the presence of an excess of zinc ions.

An object of this invention is to provide an improved process for preparing zinc sulfides, cadmium sulfides and zinc-cadmium sulfides. Another object is to provide a process for preparing said sulfides in particulate form suitable for use in making phosphors. A further object is to provide a process for preparing said sulfides which is more versatile in controlling the properties of the precipitate according to the use desired. A still further object is to provide a process for preparing said sulfides with incorporation of metal activators therewith. Another object is to provide a process for preparing zinc-cadmium sulfides which more conveniently and efficiently intermixes the zinc and cadmium sulfides. Other objects will appear hereinafter.

These and other objects are accomplished in accordance with the invention by a process for preparing zinc sulfide, cadmium sulfide or zinc-cadmium sulfides which comprises maintaining a saturated aqueous solution of hydrogen sulfide in an amount of from 300 to 1500 ml. per gram-atom of total metal ions added, adding thereto an aqueous solution of metal ions selected from the group consisting of zinc ions, cadmium ions and a mixture of zinc and cadmium ions, at a rate of from 0.5 to 5.0 percent per minute, based on the total amount of metal ions added, with vigorous agitation and separating the metal sulfide or sulfides precipitated therefrom.

Vigorous stirring and the exclusion of air during the reaction is quite important for the purpose of realizing the most efficient yield by the process of the invention, although not as critical as in the prior art processes.

In practicing the invention in the above manner, moderately slow precipitation is attained which minimizes occlusion of impurities as well as having other desirable features.

In practicing the invention in laboratory or small scale apparatus, a three-necked vessel may be fitted with a stirrer, a tube with a bubble counter exit attachment for introducing hydrogen sulfide gas and allowing excess gas to escape and a separatory funnel for the introduction of the saturated salt solution. Delivery of the hydrogen sulfide gas, which can be of commercial grade and purified by passing it through a glass wool column and through a bath of water prior to delivery to the reaction vessel, is continued until the water in the reaction vessel is saturated with $H_2S$ and all air in the apparatus is removed.

During the process the temperature is adjusted to the desired value which depends upon the sulfide compound to be produced. In the case of zinc sulfide, room temperature is the most efficacious, while in the case of cadmium sulfide and zinc-cadmium sulfide about 75° C. is preferable. When the saturation point of the water with $H_2S$ has been reached, a concentrated solution of the appropriate soluble zinc or cadmium salt is slowly added at a controlled rate from the separatory funnel, while vigorously stirring the saturated solution and the resulting slurry of the precipitated metal sulfide. The $H_2S$ flow is maintained at a rate necessary to maintain saturation. The proper rate of gas flow may be determined in a number of well known ways but in small equipment a simple bubble counter will suffice. The concentration of the metal salt solutions may vary from one to four molar. The volume of saturated $H_2S$ solution may vary from 300 ml. to 1500 ml. per mole of soluble metal salt. In the case of zinc sulfate, a practical minimum is about 350 ml. per mole and in the case of cadmium sulfate a practical minimum is about 330 ml. per mole. The useful maximum is limited only by the practical consideration of adequate yield of precipitate from a given volume of liquid. It has been found that the properties of the resulting precipitate depend, not so much on the absolute rate of addition, such as milliliters of solution per minute, but rather on the rate expressed as a fraction of the total amount of zinc salt or cadmium salt per minute, regardless of batch size or concentration of the soluble metallic salt solution. If the sulfate salts are used, useful ranges are from about 0.5 to 5.0% per minute for both zinc sulfate and cadmium sulfate. Preferred ranges are from about 0.5 to 3.5% per minute for $ZnSO_4$ and from about 0.5 to 1.7% per minute for $CdSO_4$. Particularly preferred ranges are from 1.5% to 3.5% per minute for $ZnSO_4$ and 0.5 to 1.5% per minute for $CdSO_4$.

The variation in the above ranges of rates of addition between zinc sulfate and cadmium sulfate is due to the fact that there is a marked difference between the precipitation behavior of the sulfides made from these two sulfate salts. For example, the solubility product constant for zinc sulfide is only slightly smaller than the dissociation constant for hydrogen sulfide, differing by a factor of approximately $10^2$, whereas the solubility product constant for cadmium sulfide is smaller by a factor of $10^5$ to $10^6$. Probably, because of this difference, zinc sulfide precipitates and redissolves in acid very slowly, thus thermodynamic equilibrium is difficult to attain. Although yields of nearly 100% can be obtained, the approach to quantitative precipitation becomes impractically slow. Cadmium sulfide, on the other hand precipitates rapidly and quantitatively under similar conditions, and this rapidity of reaction tends to produce cadmium sulfide of small particle size, with its attendant undesirable physical properties, especially for phosphor purposes. However, by using the instant process and conducting the reaction in a more concentrated solution, the undesirable physical properties, i.e., relatively small particle size, etc., are substantially reduced.

In making phosphors, especially from the sulfides mentioned above, it is desirable to incorporate with the sulfide prior to firing very small quantities of various metals to serve as activators. This may be conveniently accomplished by means of the present process. The desired activator may be incorporated with the metal sulfide by dissolving a soluble salt of the activator in water and adding the proper quantity to the soluble salt solution of metal to be converted into the host sulfide. For example, a small amount of silver nitrate solution may be added to a zinc-cadmium sulfate solution before its introduction into the saturated $H_2S$ solution.

As indicated above, the metal sulfides made by the process of the invention are particularly useful in making phosphors of all types, i.e., electroluminescent, cathodoluminescent, photoluminescent and roentgenoluminescent types. The zinc sulfide, for example, is quite useful in making very efficient and bright electroluminescent blue, yellow and green phosphors depending of course on the activator used and the calcining conditions and also the conditions of finel treatment after calcination. Likewise the cadmium sulfide and zinc-cadmium sulfides made by this process can be used to make superior grade phosphors.

The invention will now be further illustrated in and by the following examples which are not to be considered as limiting the scope of the invention.

*Example I*

A reaction vessel consisting of a 2-liter 3-necked flask was equipped with a stirrer, a suitable separatory funnel and a means of introducing $H_2S$ gas gas accompanied by a bubble counter gas escape means. Into said flask there was introduced 1172 ml. of demineralized water. Stirring was started and $H_2S$ gas was bubbled into the water to the point of saturation and also in quantity sufficient to displace substantially all of the air in the vessel. The saturation and displacement of air required about 15 minutes. With vigorous stirring and continuing the passing in of $H_2S$ gas to maintain saturation, 328 ml. of a 3.05 molar solution of purified zinc sulfate solution (1 mole) was added dropwise at a rate of 6 ml. per minute. This addition required 55 minutes. Stirring and $H_2S$ addition were continued for an additional 2 hours. At the end of this time the ZnS was allowed to settle for 45 minutes and the reaction liquid was decanted from the precipitate. The precipitate was washed 5 times by decantation with 500 ml. quantities of hot demineralized water. The ZnS was then dried overnight at 120° C. The ZnS, in the form of a very soft, free-flowing powder, was obtained in 97% yield.

To 29.2 grams (0.3 mole) of the above zinc sulfide there was added as an activator, 30.0 ml. of 0.1 M cupric acetate solution and 0.5 ml. of 15% NaCl solution to serve as a flux. Enough deionized water was added to make a smooth slurry. After stirring to obtain a uniform suspension, the mixture was dried overnight at 120° C., and the dry powder then lightly ground in a mortar to break up the lumps formed during drying. The resulting powder was placed in a silica crucible and then fired or calcined for 2 hours at 1000° C. in a zinc sulfide surround, the procedure being well known to those skilled in the art. The material was placed in and taken out of the furnace at firing temperature. After cooling, the dark sintered mass was crushed in a mortar with sufficient hot water to break up the mass and then transferred to a beaker where it was stirred for a few seconds with 120 ml. of 1.5% KCN solution to dissolve the surface CuS and to lighten the body color. The phosphor finally was washed twice with cold water, once with methanol, dried at 90° C. and then sieved through a 200-mesh screen. The resulting green electroluminescent zinc sulfide phosphor showed about a 10% increase in brightness over similar phosphors made from ZnS precipitated by the prior art methods, i.e., hydrogen sulfide gas passed into a stirred solution of zinc sulfate.

The phosphor was tested according to the following procedure. A cell was prepared by mixing 0.5 gram of the phosphor with 1.9 ml. of a urea formaldehyde (2 parts by weight)-alkyd resin (1 part by weight), which is a clear, thermo-setting resin, spreading the mixture on a piece of transparent, electroconductive glass which had a masked out area where one electrical contact was made, and drying the spread mixture in an oven for 30 minutes at 90° C. (prior to drying in the oven the tape masking out the electrical contact area was removed). The resultant cell had 15 mgs. of phosphor per square centimeter and a dry thickness of 8 mils. A silver electrode was then painted on the phosphor surface using metallic silver paint and leaving an unpainted margin at least ⅛ inch from the edges. The cell was again baked at 90° C. but for 10 minutes. Measurements were made of the light output at an applied field of 1000 cycles per second and 150 volts per mil.

*Example II*

Into a 1-liter 3-neck flask with the same set-up as described in Example I there was introduced 165 ml. of demineralized water. It was heated to 75° C. and maintained at this temperature throughout the reaction. While stirring, the water was saturated with $H_2S$ gas and the air above the liquid replaced with said gas, vigorous stirring and saturation being maintained throughout the subsequent sulfide-forming reaction. To the saturated solution there was added, dropwise, at the rate of 0.9 ml. per minute, 176 ml. of a 2.84 molar $CdSO_4$ solution (0.5 mole). This required 210 minutes to complete the addition. Stirring and $H_2S$ addition were continued for an additional 15 minutes. At the end of this time the CdS was allowed to settle for 2 hours and then the liquid was decanted from the resulting precipitate. Said precipitate was washed 3 times by decantation, using 250 ml. portions of hot demineralized water. The resulting cadmium sulfide was dried overnight at 120° C. The yield of CdS was almost 100% of theoretical and was quite soft and free-flowing. Fourteen and one-fourth grams of the above CdS was mixed with 15.75 grams of the free-flowing ZnS powder of Example I and slurried with 6.4 ml. of 0.001 M $AgNO_3$ solution and 11.0 ml. of a 15% NaCl solution. The material was uniformly mixed and dried overnight at 120° C. The material was then fired for 1 hour at 840° C. in a ZnS surround. The resulting phosphor was washed once with 15 ml. of a 1% $Ba(OH)_2$ solution and twice with 50 ml. of water, dried at 120° C. and finally sieved through a 325-mesh screen. The activated zinc-cadmium sulfide phosphor was very efficient and emitted bright yellow light under ultraviolet (3650 A.) excitation.

*Example III*

Into the apparatus described in Example I there was introduced 330 ml. of demineralized water which was heated to and maintained at 75° C. $H_2S$ gas was introduced while stirring, to the point of saturation and displacement of the air over the liquid. Agitation and saturation were maintained throughout the reaction. Ten ml. of 2.92 molar $ZnSO_4$ solution was added dropwise at a rate of 3 ml. per minute. Immediately after this addition, there was added a mixture of 137 ml. of a 2.92 molar $ZnSO_4$ solution and 150 ml. of a 2.84 molar $CdSO_4$ solution at a rate of 3 ml. per minute. At the completion of this addition, the heat was then turned off and 500 ml. of demineralized water was added to the slurry of precipitate. There was then added 490 ml. of a 0.29 molar $ZnSO_4$ solution at the rate of 20 ml. per minute. Stirring and $H_2S$ addition were continued for an additional 30 minutes. At the end of this time, the co-precipitate of zinc cadmium sulfide was allowed to settle for 45 minutes and thereupon it was washed by decantation 5 times, using 500 ml. portions of hot demineralized water. The co-precipitate was dried overnight at 120° C. The resutling co-precipitate was obtained in 99.5% yield as a soft free-flowing powder.

Thirty grams of the precipitate was used to make a cathodoluminescent phosphor, activating, fluxing, firing and treating it in the manner described in Example II. An efficient and satisfactory zinc cadmium sulfide phosphor which emitted bright yellow light under ultraviolet (3650 A.) light excitation was obtained.

*Example IV*

Into the apparatus of Example I there was introduced 330 ml. of demineralized water which was heated to and held at 75° C. While stirring, the water was saturated with $H_2S$ gas in quantity sufficient to displace substantially all of the air in the vessel. Vigorous stirring and saturation was maintained throughout the later precipitation step. Nine ml. of a 3.11 molar solution of $ZnSO_4$ solution was added dropwise at a rate of 3 ml. per minute. Immediately thereafter, a mixture of 129 ml. of a 3.11 molar $ZnSO_4$ solution and 141 ml. of a 3.03 molar $CdSO_4$ solution and 19 ml. of a 0.001 molar $AgNO_3$ solution was added at a rate of 3 ml. per minute. The heat was then turned off and 500 ml. of demineralized water was added to the slurry of precipitate. There was then added, at a rate of approximately 20 ml. per minute, a solution consisting of 46 ml. of a 3.11 molar solution $ZnSO_4$ and 6 ml. of a 0.001 $AgNO_3$ solution diluted to a volume of 490 ml. with demineralized water. Stirring and $H_2S$ gas addition were continued for an additional time of approximately 40 minutes. At the end of this time, the co-precipitate of zinc cadmium sulfide was allowed to settle for 45 minutes. It was washed by decantation 5 times with 500 ml. portions of hot demineralized water. It was then slurried with 43 ml. of 15% NaCl solution and dried overnight at 120° C. The resulting co-precipitate, obtained in 98.7% yield, was a very soft and free-flowing powder. The latter material was made into a satisfactory photoluminescent and cathodoluminescent phosphor as described in Example II.

The zinc and cadmium sulfate solutions for use in the instant process must be extremely pure and may be so obtained by methods well-known in the art. For example, suitable methods are described in Leverenz, "An Introduction to Luminescence of Solids," published by Wiley & Sons (1950). Demineralized water was prepared by passing singly distilled water through a "Crystalab Deeminizer" (sold by "The Atomic Center," New York, N.Y.), demineralizing device. Also, there was used doubly distilled water prepared in an all glass laboratory still.

To further illustrate this purification a 20-mole batch of a 3-molar $ZnSO_4$ solution is prepared in the following manner ($CdSO_4$ may also be prepared in an analogous manner). To 5800 ml. of demineralized water there is added slowly with stirring 1100 ml. of conc. (95–98%) $H_2SO_4$. After cooling, 1630 grams of reagent grade ZnO is added with stirring, keeping the temperature below 100° C. Stirring is continued for 30 minutes, after which the solution is filtered and adjusted to pH 3.0 with $H_2SO_4$. The Zn ion concentration will be about 3.0–3.2 molar. Forty-five hundred ml. of this solution is stirred with 29 grams of reagent grade zinc dust for 7 hours at 85° C. The conditions for the above reaction must be carefully controlled for best results. The solution is allowed to stand overnight and is then filtered. The filtrate is warmed to 60° C. and then there is added 13.5 ml. of 30% $H_2O_2$ and the solution is stirred for 30 minutes and then allowed to cool. One hundred three ml. of a 3 molar solution of $NH_4OH$ is very slowly added with vigorous stirring, and then the slurry is allowed to settle overnight. The material is then filtered.

The last purification, a fractional sulfide precipitation, is carried out in two steps, using 4.5 ml. of 20% $(NH_4)_2S$ solution and stirirng for 15 minutes for each step. The first precipitation is held for 2 hours before filtering. The second precipitate is held overnight. In each case the filtration was carried out through a fritted glass filter.

Other zinc and cadmium salts may be used in place of the sulfates. For example zinc and/or cadmium chlorides and nitrates may be used. Mixtures of these salts with the sulfates may also be used. When the precipitated sulfide is to be used as the starting material for phosphor preparation and that preparation involves the use of a chloride flux, (e.g. copper or silver activated zinc sulfide or silver-activated zinc-cadmium sulfide, normally fluxed with chloride) a zinc and/or cadmium chloride may be used in the sulfide preparation. In this case some of the cholride ion will remain with the precipitated sulfide and serve as part of the fluxing material for the phosphor. Mineral acid salts are preferred because of the low pH which is reached at the end of the reaction. This favors conditions which promote the formation of non-colloidal particles which settle rapidly without occlusion and which can be washed by decantation.

Any soluble salt of the desired activator cations may be used in addition to or in place of silver nitrate, i.e. cupric acetate, sulfate or chloride; lead acetate or nitrate; or gold chloride. These may be added in amounts ranging from about $10^{-6}$ to about $10^{-2}$ gram-atoms of activator cations per gram-molecule of host sulfide, exact quantities depending on the particular type of phosphor to be prepared.

As indicated above, the products of the novel process are quite useful in the manufacture of phosphors for the manufacture of cathode ray tubes, for electroluminescent cells, for lighting devices, or other applications in which sulfide type phosphors are useful. The resulting compounds may also find utility in other fields, i.e. paints and fillers in coating porous surfaces such as paper.

The invention offers a method of making sulfide compounds of improved overall quality which makes them especially adapted for the manufacture of electroluminescent phosphors. In this field efficiency and brightness of the phosphors are of paramount importance.

The process also provides greater versatility in controlling the properties of the precipitate according to the desired requirements than is attainable by the prior art methods. For example, the zinc, cadium and activator sulfides may be precipitated in any desired order or in any desired combination to obtain specific properties.

The method offers a more convenient and efficient means of producing intermixed zinc and cadmium sulfides and also a better method of incorporating the activator into the precipitated sulfide compound.

In the instant process there is less tendency for the precipitated sulfides to dry as hard lumps thereby eliminating a miling operation which is costly, time consuming and undesirable in the manufacture of phosphor grade compounds.

The process also provides a convenient method of consistently obtaining high yields without the necessity of utilizing complicated and costly apparatus.

As many apparently widely different embodiments of this invention may be made without departing from the spirit and scope thereof, it is to be understood that this invention is not limited to the specific embodiments thereof except as defined in the appended claims.

What is claimed is:

1. Process for preparing phophor grade metal sulfides which comprises maintaining a saturated aqueous solution of hydrogen sulfide, displacing substantially all air from contact with said solution, adding thereto an aqueous solution containing from 1 to 4 molar concentration of at least one metal ion of an inorganic salt selected from the group consisting of zinc and cadmium ions at a rate of from 0.5 to 5.0 percent per minute, based on the total amount of metal ions added, the amount of said aqueous hydrogen sulfide solution being from 300 to 1500 ml. per gramatom of total metal ions added, and separating the precipitated metal sulfides.

2. A process as defined in claim 1 wherein the solution is vigorously agitated during the addition of solution of metal ions.

3. Process for preparing phosphor grade zinc sulfide which comprises maintaining a saturated aqueous solution of hydrogen sulfide, displacing substantially all air from contact with said solution, adding thereto with vigorous agitation an aqueous solution solution of zinc ions of an inorganic salt of from 1 to 4 molar concentration, at a rate of from 0.5 to 3.5% per minute, based on the total amount of zinc ions added, the amount of said aqueous hydrogen sulfide solution being from 300 to 1500 ml. per gram-atom of total zinc ions added, and separating the percipittaed zinc sulfide.

4. Process for preparing phosphor grade cadmium sulfide which comprises maintaining a saturated aqueous solution of hydrogen sulfide, displacing substantially all air from contact with said solution, adding thereto, with vigorous agitation, an aqueous solution of cadmium ions of an inorganic salt of from 1 to 4 molar concentration, at a rate of from 0.5 to 1.7% per minute, based on the total amount of cadmium ions added, the amount of said aqueous hydrogen sulfide solution being from 300 to 1500 ml. per gram-atom of total cadmium ions added, and separating the precipitated cadmium sulfide therefrom.

5. Process for preparing phosphor grade zinc-cadmium sulfide which comprises maintaining a saturated aqueous solution of hydrogen sulfide, displacing substantially all air from contact with said solution, adding thereto with vigorous agitation an aqueous solution of a mixture of zinc and cadmium ions of an inorganic salt of from 1 to 4 molar concentration at a rate of from 0.5 to 3.5% per minute, based on the total amount of zinc and cadmium ions added, the amount of said aqueous hydrogen sulfide solution being from 300 to 1500 ml. per gram-atom of total zinc and cadmium ions added, and separating the precipitated zinc-cadmium sulfide.

6. Process according to claim 1 wherein the aqueous solution of metal ions contains a small amount of a water-soluble salt of a metal activator.

7. Process according to claim 1 wherein the aqueous solution of metal ions contains a small amount of water-soluble silver salt.

8. Process for preparing phosphor grade metal sulfides which comprises maintaining a saturated aqueous solution of hydrogen sulfide, displacing substantially all air from contact with said solution, adding thereto with vigorous agitation an aqueous solution containing from 1 to 4 molar concentration of at least one water-soluble metal sulfate selected from the group consisting of zinc and cadmium sulfates at a rate of from 0.5 to 5.0 percent per minute based on the total amount of metal sulfate added, the amount of said aqueous hydrogen sulfide solution being from 300 to 1500 ml. per gram-atom of total metal sulfates added, nad separating the precipitated metal sulfides.

References Cited in the file of this patent

UNITED STATES PATENTS

| | | |
|---|---|---|
| 2,285,464 | Ruthruff | June 9, 1942 |
| 2,607,705 | Kumins | Aug. 19, 1952 |
| 2,670,271 | Thomsen | Feb. 23, 1954 |